July 17, 1923.

T. G. RENNERFELT

ROLLER BEARING

Filed April 15, 1922

1,462,379

WITNESSES:
E. M. Aslrön
E. M. Gustavsson

INVENTOR:
Ture Gustaf Rennerfelt

Patented July 17, 1923.

1,462,379

UNITED STATES PATENT OFFICE.

TURE GUSTAF RENNERFELT, OF STOCKHOLM, SWEDEN.

ROLLER BEARING.

Application filed April 15, 1922. Serial No. 553,061.

*To all whom it may concern:*

Be it known that I, TURE GUSTAF RENNERFELT, subject of the King of Sweden, and resident of Stockholm, in the county of Stockholm and State of Sweden, have invented certain new and useful Improvements in Roller Bearings, of which the following is a specification.

Figure 1:
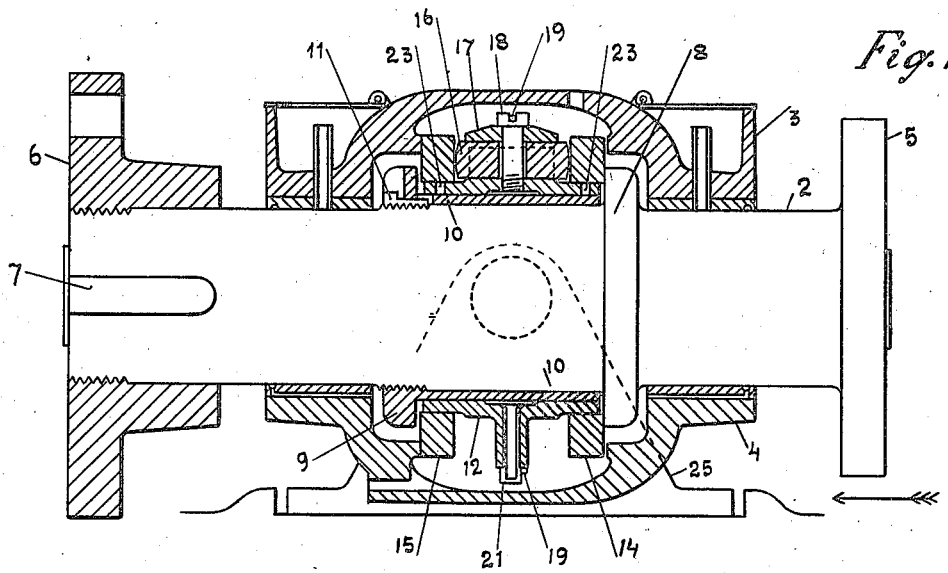
Figure 2:
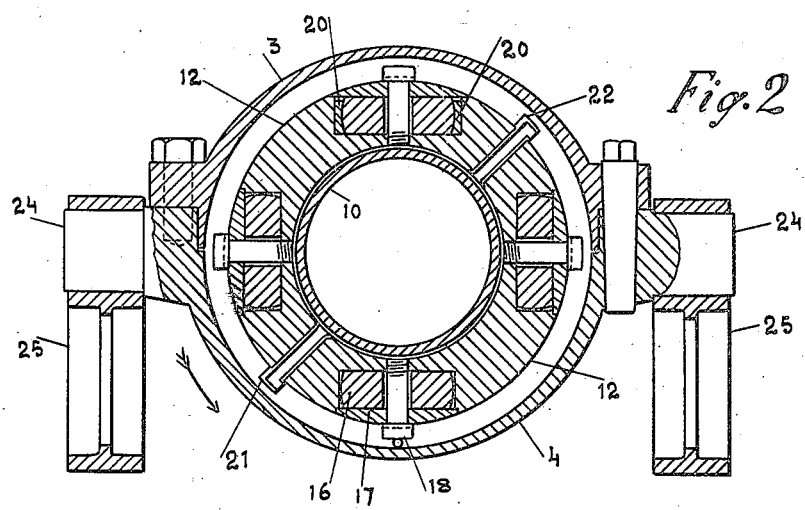
Figure 3:
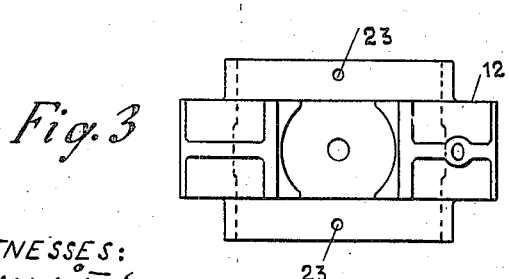
Figure 4:
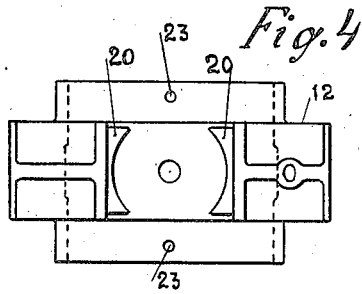

My invention relates to improvements in roller bearings for sustaining heavy end pressures. Its object is to accomplish such a bearing with small frictional resistance and with good wearing qualities so that it sustains its load with a sufficient degree of safety and operates in a satisfactory manner. The invention is illustrated in the accompanying drawings, in which Fig. 1 is a section of such a bearing as applied to a propeller shaft and arranged to sustain the thrust in either direction. Fig. 2 is a cross sectional view of the same bearing. Fig. 3 shows a detail, termed the yoke. Fig. 4 shows a modification of the yoke.

Referring to the drawings, 2 represents a shaft journalled in bearings formed in a casing constructed in two halves, 3 and 4. A coupling 5 is formed integral with the shaft, and another coupling 6 is fastened to the shaft by means of a screwthread and the key 7. The shaft is to be bolted to the propeller shaft so that it constitutes a part thereof. 8 represents a flange integral with the shaft and 9 another flange, formed with a sleeve or neck 10, threaded on the shaft, and locked thereto by means of the key 11, so that it acts as a part of the shaft. A yoke 12 is journalled on the neck, and racerings 14 and 15 are rotatably mounted upon each end of the yoke in close proximity to the flanges 8 and 9. The yoke is formed with pockets in which the rollers 16, 16— three or more in number—are located, free to rotate but without any loose play. The rollers are formed with convex rolling faces in contact with the flat faces of the racerings 14 and 15. The roller is also formed with flat end faces and provided with a hole through its centre. 17, 17 represent plates or lids fastened to the yoke by bolts 18 passing through, but not in contact with, the rollers. The bolts 18 are locked by a wire 19 placed in slots formed in the heads of the bolts. The pockets are so formed in the yoke, and the rollers are so located in the pockets that the axes of rotation of the rollers are directed to the centre line of the shaft. The roller is free to rotate around a free axis, but is prevented by contact with the lid and with the bottom of the pocket from any other motion relatively to the yoke. To minimize the frictional resistance of the bearing it is necessary that the centre line of the roller shall deviate as little as possible from the aforesaid direction. To provide sufficient wearing surface between the yoke and the convex faces of a roller, the walls of the pockets are formed circular conforming to the circumference of the roller. The circular walls may be formed directly in the yoke as shown in Fig. 3 or upon separate wearing blocks 20 as shown in Fig. 4 and shown also in Fig. 2, said blocks being free to slide in the pockets in direction parallel with the shaft. It will thus be seen that the roller is securely held by contacts with the yoke and with the lid in a certain and definite position relatively to the yoke.

In order to guard against wear between the yoke and the shaft upon which it is journalled—which wear might in time cause a loose play that would affect the aforesaid proper direction of the centre line of the rollers—provision is made for liberal lubrication of the contact surface between the yoke and the shaft. Two oil pipes 21, 22 are riveted in the yoke passing from its circumference to its bore. A quantity of oil is contained within the casing and when the shaft, and thus the yoke, rotates in the direction of the curved arrow, oil is forced through the pipe 21 to the said contact surface. Upon rotation in the opposite direction oil will be forced through the pipe 22, the open end of which faces the opposite way. From the bore of the yoke the oil escapes through the holes 23 in the yoke and lubricates the contacts between the racerings and the yoke.

The lower half of the casing is formed with trunnions 24, 24, the centres of which are located in the same plane as the centres of the rollers. The trunnions rest in strong supports 25 securely fastened to the hull of the vessel. The trunnions act so as to prevent harmful bending of the shaft or undue strain on the bearing caused by flexure or vibration of the hull.

In operation, when the pressure from the shaft is directed as the straight arrow, the racering 14 will rotate with the shaft by reason of friction against the flange 8, and the ring 15 is kept stationary on account of pressure against the casing. When the direction of pressure is reversed the ring 15 rotates with the shaft, and the ring 14 is pressed against the casing. In either case the thrust is taken on the rotating rollers and transmitted through one of the racerings to the trunnions and to the supports 25. The rollers are made of hardened and ground steel, and sufficiently large to sustain the load with any desirable degree of safety.

What I claim is:

1. The combination of a shaft, a flange thereon, another flange threaded on the shaft, two racerings rotatably mounted on the shaft between the flanges, a yoke journalled on the shaft, a plurality of rollers mounted in the yoke in contact with the racerings, and a lid fastened to the yoke in contact with the end surface of a roller.

2. The combination of a shaft, a flange thereon, another flange threaded on the shaft, said flange being formed with a neck, a yoke journalled on the neck, two racerings rotatably mounted on the yoke, a plurality of rollers located in the yoke in contact with the racerings, and a lid fastened to the yoke in contact with the end surface of a roller.

3. The combination of a shaft, a flange thereon, another flange threaded on the shaft, two racerings rotatably mounted on the shaft between the flanges, a yoke journalled on the shaft, and a plurality of rollers mounted in the yoke in contact with the racerings, the yoke being provided with an oil channel leading from its periphery to its bore.

4. The combination of a shaft, a flange thereon, a racering in contact with the flange, a yoke journalled on the shaft, a plurality of rollers mounted in the yoke in contact with the racering, a lid in contact with the yoke and with the roller, the lid fastened to the yoke by a bolt leading through the centre of the roller, there being no contact between the bolt and the roller.

5. The combination of a shaft, a flange thereon, two racerings mounted around the shaft, a yoke journalled on the shaft between the racerings, a plurality of rollers mounted in the yoke in contact with the racerings, and means for automatically lubricating the contact between the yoke and the shaft.

6. The combination of a shaft, a yoke journalled on the shaft, two racerings rotatably mounted on the yoke, a plurality of rollers mounted in the yoke in contact with the racerings, and means for automatically lubricating the contacts between the yoke and the racerings.

7. The combination of a shaft, a flange thereon, another flange threaded on the shaft, two racerings rotatably mounted on the shaft between the flanges, a yoke journalled on the shaft and formed with pockets having flat bottoms and circular walls, a roller in each pocket in contact with the racerings, and a lid fastened to the yoke in contact with each roller.

8. The combination of a shaft, a flange thereon, another flange threaded on the shaft, two racerings rotatably mounted on the shaft between the flanges, a yoke journalled on the shaft and formed with pockets having flat bottoms, blocks arranged to slide in the pockets parallel with the shaft, a roller in each pocket in contact with the blocks, and a lid fastened to the yoke in contact with each roller.

9. The combination of a shaft, a flange thereon, another flange threaded on the shaft, a yoke journalled on the shaft, two racerings rotatably mounted on the shaft, a plurality of rollers mounted in the yoke in contact with the racerings, and a casing surrounding the racerings and the rollers, the casing being formed with two trunnions the centres of which are located in the same plane as the centres of the rollers.

10. The combination of a shaft, a yoke rotatably mounted around the shaft, two racerings, a plurality of rollers having flat ends and convex rolling faces mounted in the yoke in contact with the racerings, and a lid fastened to the yoke and arranged together with the yoke to hold the roller in a definite position relatively to the yoke.

Signed at Stockholm, in the county of Stockholm and State of Sweden this 28th day of March A. D. 1922.

TURE GUSTAF RENNERFELT.

Witnesses:
E. M. ÅSTROIN,
L. BERG VON LINDE.